United States Patent [19]

Nixdorf et al.

[11] 4,202,069
[45] May 13, 1980

[54] WINDOW CLEANING APPARATUS

[75] Inventors: Hans W. Nixdorf; Günther Tölle, both of Düsseldorf-Wittlaer, Fed. Rep. of Germany

[73] Assignee: ever clean GmbH H. W. Nixdorf, Düsseldorf, Fed. Rep. of Germany

[21] Appl. No.: 968,983

[22] Filed: Dec. 13, 1978

[30] Foreign Application Priority Data

Dec. 16, 1977 [DE] Fed. Rep. of Germany ....... 2756126

[51] Int. Cl.² .............................................. B60S 1/50
[52] U.S. Cl. .............................. 15/250.03; 24/255 SL
[58] Field of Search ........... 15/250.03, 250.01, 250.04, 15/250.35; 24/255 SL

[56] References Cited

U.S. PATENT DOCUMENTS

| 3,713,622 | 1/1973 | Dinger | 24/255 SL |
|---|---|---|---|
| 3,803,664 | 4/1974 | Triplett | 15/250.03 |
| 3,859,689 | 1/1975 | Rouse | 15/250.03 |
| 3,906,592 | 9/1975 | Sakasegawa et al. | 24/255 SL |
| 4,016,623 | 4/1977 | Nixdorf | 15/250.03 |

Primary Examiner—Philip R. Coe

[57] ABSTRACT

A vehicle windscreen cleaner device comprises a container which can be fastened to or is made integral with a windscreen wiper arm. The container is cylindrical and a portion of one side wall is grid-like with apertures. Either a part of the side wall or part of the end wall are removable to permit the insertion of a stick or rod of cleaning agent. In use, when the vehicle is used in the rain water is entrained into the container by the slipstream, dissolves some of the cleansing agent and is entrained onto the windscreen.

16 Claims, 6 Drawing Figures

WINDOW CLEANING APPARATUS

BACKGROUND OF THE INVENTION

This invention relates to a vehicle windscreen cleaner and more particularly to a vehicle windscreen cleaner having a partially open container for containing water-soluble, cleaning and/or rinsing agent, preferably in a solid form, the container having means to attach the container releasably in position at a point in front of a vehicle windscreen.

The words cleaning and/or rinsing agent are used in this Specification to mean any suitable detergent or anti-smear agent that may be applied to a vehicle windscreen to improve visibility through the windscreen.

Windscreen cleaners of the kind spcified above are as a rule releasably attached to the windscreen wiper blade, and use a comb-shaped applicator to transfer the cleaning or rinsing agent, which may be released by rain or splashes, or other water applied to the windscreen, from the container to the windscreen. The cleaning and rinsing agent then acts to dissolve and release layers of dirt and grease and protein-containing coatings from the windscreen and eliminates smears which spoil visibility during driving.

It has been proposed to provide a windscreen cleaner in which the cleaning and rinsing agent can be transferred to the windscreen without causing wear or stressing of the surface of the screen and without scratching the screen. In this proposal the container for the cleaning and/or rinsing agent is attached, at a distance from the vehicle windscreen, by attaching elements neither to a moving part of the windscreen wiper, or to a stationary part of the vehicle, so that the slipstream generated when the vehicle moves along can directly or indirectly flow into the inside of the said container, through its open side, scavenging the cleaning or rinsing agent and thus entraining drops of the agent in the slipstream, and causing the drops to impinge on the windscreen. The only mechanical connection of the container to parts of the motor vehicle is constituted by the attaching elements. The special advantage of this arrangement is the elimination of a mechanical applicator, which, in previously known windscreen cleaners was the cause of both wear and scratches on the surface of the windscreen. The Application of the entrained drops is performed uniformly and automatically, and the drops are always generated during the periods in which the windscreen wiper must be actuated to remove moisture deposited on the windscreen, since moisture deposited on the windscreen is also deposited on the cleaning and/or rinsing agent. The cleaning and rinsing agent is distributed over the whole width of the windscreen firstly by the action of the windscreen wiper and additionally by the action of the slipstream, due to the inclined curved nature of the windscreen.

In prior proposed cleaners the container for receiving the cleaning and/or rinsing agent took the form of a trough, open on one side, which was filled by the manufacturer with a pasty or solid cleaning and/or rinsing agent. The inside of the container had projections for retaining the pasty or solid cleaning or rinsing agent in place. In the prior art windscreen cleaners it was a relatively laborious operation to refill the trough with the concentrate of cleaning and/or rinsing agent. For instance, the trough of the windscreen cleaner had to be released from its mounting, which might be on the windscreen wiper blade, and either a new block of solid cleaning and/or rinsing agent had to be inserted in position or a generally pasty concentrate of the agent had to be distributed uniformly in the trough, smoothed, and more particularly forced tightly in to the inner corners of the trough. Hitherto, as a rule, people using these prior proposed cleaners have avoided these operations, and instead have substituted a fresh windscreen cleaner, filled by the manufacturer with the cleaning and/or rinsing agent, instead of re-filling the trough of the old cleaner. Moreover, the projections provided in the trough for retaining the rinsing agent are effective only to a limited extent, since they must not completely close the open side of the trough. For this reason, in the prior art containers, the cleaning agent tends to be washed out of the container as lumps or pasty masses before it has become completely used up. Thus not all the cleaning and/or rinsing agent is used, and some of the agent is washed.

OBJECT OF THE INVENTION

It is therefore an object of the invention to provide a windscreen cleaner which can be simply manufactured and can be readily mounted in position, for example on a windscreen wiper arm, in front of a vehicle windscreen, and which has a container for receiving an element of a preferably solid, water-soluble cleaning and/or rinsing agent, which can be replaced very simply and inexpensively the container being adapted so that only a minimum of the agent is wasted.

SUMMARY OF THE INVENTION

According to this invention there is provided a vehicle windscreen cleaner device having at least one partially open container, in which a cavity is formed to receive a water-soluble, substantially solid or pasty concentrate of cleaning agent or the like, the container being at least partly defined by a movable or removable member which can be moved or removed to permit an element of said cleaning agent or the like to be inserted into the cavity and mounting means, connected to the container, for the mounting of the windscreen cleaner at a distance in front of the vehicle windscreen.

Preferably the container comprises: a bearer part; a closure part which can be fitted to the bearer part; and means for releasably connecting the bearer part and the closure part being so formed that in the assembled position they enclose and bound the cavity, the closure part constituting said movable or removable member.

It has been appreciated that the reason for the laborious topping up of the container of the prior proposed device was the one-piece construction of the prior device, and it is the design of the device which makes it necessary that the cleaning and/or rinsing agent concentrate must be made to adhere to the walls of the container. In a preferred embodiment of this invention the replacement of the cleaning and/or rinsing agent concentrate is straightforward in that the concentrate can be laid loosely in a practically solid rod in the container and can be retained therein in a usable position.

When a preferred embodiment of a windscreen cleaner device in accordance with the invention, preferably retained on a windscreen wiper arm, is used, a rod-shaped cleaning and rinsing concentrate insert is completely enclosed and fixed by the interengaging or interlocked bearer and closure parts of the container. Due to the grid-shaped or cage-shaped wall zone of the container, on the one hand the slipstream and together therewith the splashed water or rainwater can penetrate into the inside of the container to release the concentrate and on the other hand the dissolved cleaning and/or rinsing agents can escape from the container on to the windscreen. A fresh inserted rod of concentrate can be introduced by a few movements of the hand, the catch or locking device holding the bearer and closure parts together being released and the two parts being opened to such an extent that the rod of concentrate can be introduced into the container, the two component parts of the container finally being reclosed, latched or locked, the inserted rod lying firmly or loosely between the two parts of the container.

In a preferred embodiment of the invention the container cavity has an elongate shape, suitable for receiving a rod-shaped solid cleaning and/or rinsing agent concentrate, and has a periphery which is always substantially parallel to the axis, the bearer part and closure part each comprising an element having an open side, the two parts being joined together by their open sides in a dividing plane which is substantially parallel with the axis. The closure part can have two longitudinal struts which adjoin the dividing plane and extend parallel with one another, and transverse ribs which connect the longitudinal struts, extend substantially arcuately and are spaced out from one another, the apertures for the passage of the liquid being formed between the transverse ribs.

Preferably the closure part is made of resilient deformable plastics material and can be deformed to such an extent that the catch device operative between the two component parts of the container can be engaged and released. In one embodiment of the invention the adjacent end faces of the closure part and bearer part are formed with catch elements interengaging in pairs for the releasable retention of the closure part. In this embodiment the closure part can first be slightly compressed for release, and lifted from the bearer part, whereafter it is forced back again into its latching position on the bearer part with renewed slight deformation.

In an alternative embodiment the receiving container is a one-piece injection moulding of resiliently deformable plastics material, the closure part being moulded on to the bearer part, with provision for pivoting, at a lateral edge, via a thinned folding place, forming a resilient joint, and the bearer part and closure part being formed with co-operating catch elements at a place at a distance from the resilient joint. For replacing the inserted concentrate rod, the closure part is hinged upwards from the bearer part and then closed again over the inserted rod.

In another embodiment of the invention the bearer part is an integral, elongate hollow member having a grid-shaped or cage-shaped peripheral portion and a closed second peripheral portion, the closure part taking the form of a lid such as a pivotable lid closing an end face of the hollow member. Thus the container is substantially cylindrical and the movable or removable lid member is movable or removable to provide an access aperture in one end wall of the cylindrical container. In this embodiment the inserted concentrate rod is pushed into the hollow member through the aperture closable by the lid.

In a preferred further development of the invention at least some of the ribs forming the grid-shaped or cage-shaped peripheral portion of the receiving container have a substantially triangular cross-section. one edge of the section being turned towards the inside of the container. In this way the inserted rod of cleaning and rinsing agent engages relatively sharp, engaging edges, which provide the inserted rod with an additional, more particularly axial, hold in the inside of the container.

In a preferred embodiment of the invention the inside of the container is covered by a closed outer surface of the bearer part which forms the top side of the container. When the windscreen cleaner device is attached at a distance from the windscreen and without means for the mechanical application of the cleaning and rinsing agent, this closed cover wall prevents the inserted rod of concentrate being released, for instance by the rain, and used up when the vehicle is stationary.

Preferably an outwardly projecting, two-armed clamp, which acts as an attaching means for the releasable attachement of the windscreen cleaner device to a windscreen wiper, is mounted on said container, the clamp having at least one pivoting arm which can be moved to embrace a carrier arm of a windscreen wiper, the clamp being lockable in the closed windscreen wiper carrier arm embracing position by a closure.

In an alternative embodiment the bearer part can be formed integrally with the windscreen wiper arm and is preferably punched from sheet metal and shaped. The closure part can be made either of plastics or of a resiliently deformable metal.

BRIEF DESCRIPTION OF DRAWINGS

In order that the invention may be more readily understood and so that further features thereof may be appreciated the invention will now be described by way of example with reference to the accompanying drawings, in which.

DESCRIPTION OF PREFERRED EMBODIMENTS

Figure 1:
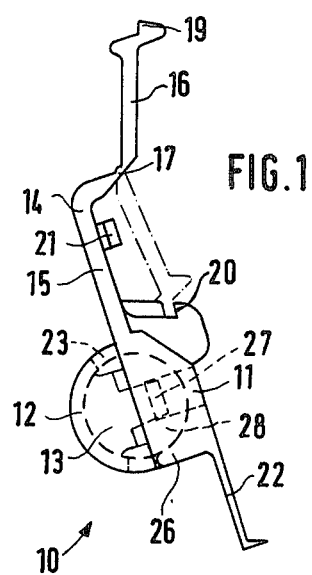
FIG. 1 is a diagrammatic and elevation on an enlarged scale, of one embodiment of a two-part windscreen cleaner device in accordance with the invention.
Figure 2:
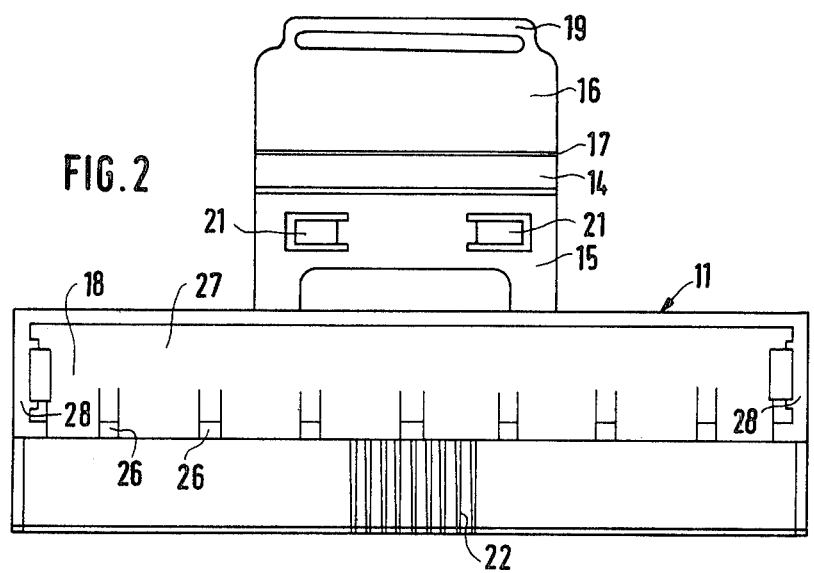
FIG. 2 is a plan view of the inside of a first part of the windscreen cleaner illustrated in FIG. 1.

Referring to FIG. 1 a windscreen cleaner device 10 comprises two shell-shaped parts, which when assembled together completely enclose a cylindrical inner space 13. The two parts 11, 12 are resiliently deformable plastics mouldings. Moulded on the first part 11, which in this Specification will be termed the bearer part, is a mounting clamp 14 having a first arm 15, and a second arm 16 which takes the form of a pivoting arm which can be pivoted about a thin portion or hinge web 17, acting as a resilient joint, about an axis parallel with the axis 18 (FIGS. 2 and 3) of the cylindrical inner space of the container formed by the parts 11, 12. Formed on the free end of the pivoting arm 16 is a catch attachment 19 which in the closure position of the clamp 14 illustrated in phantom in FIG. 1, engages behind a catch shoulder 20 moulded on the outside of the bearer part 11.

In the embodiment illustrated in FIG. 1, the windscreen cleaner can be attached to the carrier arm of a windscreen wiper by the clamp 14, the arm 15 being located under the windscreen wiper carrier arm, and the pivoting arm 16 being pivoted over the windscreen wiper carrier arm into the latched position shown in phantom in FIG. 1, the clamp 14 thus embracing the windscreen wiper arm. Moulded on the side of the fixed arm 15 adjacent the pivotable arm 16, parallel with the axis 18 are two projections 21 which, when the windscreen cleaner device 10 is attached to a windscreen wiper carrier arm formed of U-sectioned channel engage in the longitudinal recess defined by the U-shaped channel and prevent undesired pivoting movements of the windscreen cleaner device 10 relative to the windscreen wiper arm.

Over the major part of the outer surface of the device 10 namely approximately from the point of connection of the attaching clamp 14 to the point of connection to a comb-like row of tines 22, the container comprising the bearer part 11 and closure part 12 is closed, being substantially open over the rest of its outer surface. In particular, the outer surface formed by the second part 12, herein termed the closure part, is substantially open. When mounted on a windscreen wiper carrier arm, the closed outer surface of the container forms substantially the top side and protects the internal space 13 and therefore a rod of a solid cleaning and rinsing agent concentrate (not shown) located within space 13, from the rain. On the other hand the closure part 12 is grid-shaped, having a large number of apertures therein. As can be seen from FIG. 3 the part 12 is formed from two longitudinal struts 23 which lie immediately adjacent the edges of the part 11, and arcuate transverse ribs 24 connecting the longitudinal struts 23. In cavity 13 defined between the shell-shaped bearer and closure parts 11, 12 there is space to accommodate rod of a rising and cleaning agent concentrate. In use of the windscreen cleaning device with a rod of concentrate in position water enters from outside the cavity 13 and the rinsing and cleaning agent released by rain or splashes emerges, more particularly through the apertures between the transverse ribs 24, the rod-shaped concentrate element being retained at all times inside the container.

Figure 3:
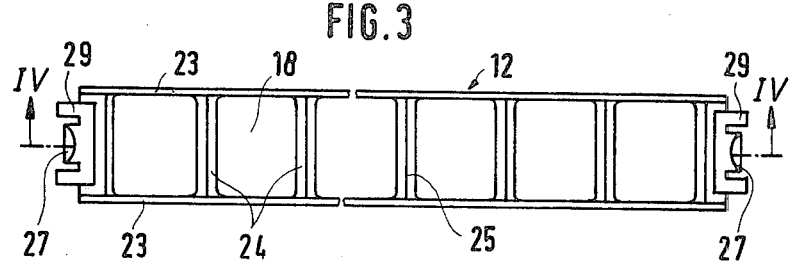
FIG. 3 is a view of the inside of the second part of the windscreen cleaner illustrated in FIG. 1.
Figure 4:
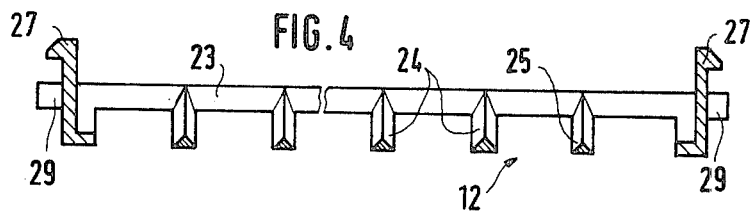
FIG. 4 is a sectional view, taken along the line IV—IV in FIG. 3.

As shown in FIGS. 3 and 4, the transverse ribs 24 each have a substantially triangular cross-section with a sharp or pointed edge 25 pointing towards the cavity 13 with the container formed by the parts 11,12. A rod of rinsing agent disposed in the cavity 13 within the container formed by the parts 11, 12 is gripped to minimise axial movement thereof by the sharp or pointed edges 25 of the transverse ribs 24.

To ensure a sufficient release of concentrate from the rod in cavity 13 the outwardly open portion of the cavity is further increased by a series of spaced-out teeth 26 which are moulded on the closed peripheral portion 27 of the bearer part 11 and extend by their face ends as far as the closure part 12. Thus further apertures are formed by the spaces between the teeth 26, the spaces being partly bounded by the struts 23. In the embodiment illustrated in FIGS. 2 to 4, the teeth 26 are spaced out by the same axial distance as the transverse ribs 25 of the closure part 12, and when the closure part is applied to the first part 11 the teeth 26 are substantially aligned with such ribs 25. However, the teeth 23 are optional.

A comb-like series of tines 22, is moulded on the bearer part 11, substantially at the point of attachment of the series of teeth 26, catches drops of water carried along by the slipstream and leads them, due to adhesion and capillary effect, and under the influence of the slipstream into the inside 13 of the container 11, 12. The cleaning and rinsing agent released by water is also atomised by the slipstream, and is entrained by the slipstream and flows out of the container 11, 12 through the part of the outer surface of the container formed with the above described aperture on to the adjacent windscreen.

The closure part 12 is releasably connected to the bearer part 11 by means of snap-fastening means 27 at each end of the member 12. The snap fasteners 27 project beyond the plane containing the struts 23 and engage behind latching recesses formed in the end walls 28 of the bearer part 11. Projections 29 formed on each end face of the closure part 12 form abutments for supporting the closure part 12 on the adjacent edge of the end wall 28 of the bearer part 11. As a result the closure part 12 can be removed from the bearer part 11 in a very simple manner since the closure part, made of a resilient deformable material, can be compressed in the direction of the axis of the cavity 13 to such an extent that the snap fasteners 27 on the two end faces are released from engagement.

Figure 5:
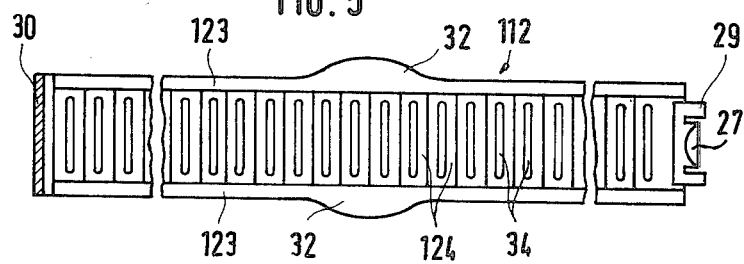
FIG. 5 is a view of the inside of an alternative form of second part, which is a variant of that illustrated in FIG. 3, and which is rigidly connected via a resilient joint on one side to the first part.

FIG. 5 shows a modified closure part 112 of an alternative embodiment of the invention in which the closure part does not have the catch device provided on both sides in the embodiment previously described, but is moulded, with provision for pivoting, at one end, via a resilient joint 30 on the bearer part (not shown in FIG. 5). At the other end the previously described snap fastening device is provided with the snap fastener 27 and the two projections 29. To place a fresh concentrate rod in the cavity of a device provided with such a closure part 112, the closure part 112 is grasped by two handle attachments moulded on the longitudinal struts 123, the snap fastener 27 is released, accompanied by the bending of the closure part, and the closure part is hinged upwards around the pivoting axis formed by the resilient joint 30, so that a large enough unobstructed aperture is created for the insertion of the fresh rod. After insertion, the closure part 112 is closed again and so is the snap fastener 27 is reengaged.

In the case of the closure part illustrated in FIG. 5, the gaps 34 between adjacent transverse webs 124 are substantially narrower than in the embodiment illustrated in FIG. 4. In operation the narrower opening cross-section results in a more economic or slower rate of removal of concentrate and an even more complete utilization of the inserted concentrate rod, since the rod will have to disintegrate into very small parts before any of the rod can fall out of the container and be wasted.

The embodiments described with reference to FIGS. 1 to 5 are made of plastics material mouldings which can be manufactured very simple since, due to the dividing plane between two parts 11, 12, in the cylinder axis 18, each part can be completely moulded without undue difficulty.

In a modified embodiment (not shown) the zone of outer surface formed with apertures and the closed zone of the outer surface are formed in one piece, and in the region of one end wall an aperture is provided through which a fresh concentrate rod can be introduced axially. The aperture is closed by a pivoting flap or a separately applied closure flap.

Figure 6:
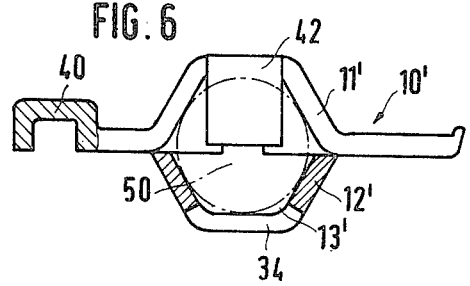
FIG. 6 is a diagrammatic side elevation of an embodiment of a two part windscreen cleaner which is a variant of that illustrated in FIG. 1, and in which the first part is integral with a windscreen wiper arm.

FIG. 6 shows an embodiment, a modification of that illustrated in FIG. 1, of a windscreen cleaner 10' in which the bearer part 11' is unitary with a windscreen wiper arm 40, which is shown in cross-section. Since, in operation, a windscreen wiper arm 40 may be heavily loaded as a rule it is made of sheet metal which is relatively resistant to bending. Thus the bearer part 11' of the windscreen cleaner device 10', mounted on the side of the windscreen wiper arm 40, is therefore also made of sheet metal. Both the windscreen wiper arm 40 and also the bearer part 11' integral therewith can be made in conventional manner by cold forming, end-face flaps 42 also being formed by cold-forming to take the place of the end wall 28 described in the first embodiment. Basically the closure part 12' can be constructed in the same way as illustrated in FIGS. 3 and 4. For aesthetic reasons the closure part 12' in FIG. 6 has a cross-sectional shape corresponding to that of the bearer part 11', which apertures 34, similar in shape to those shown in FIG. 5, being formed merely in the closure part 12'. FIG. 6 shows the closure part 12' closed over rod of concentrate 50 shown by a chain-dot line. The crosssection of a fresh inserted concentrate rod 50 is such that it fits neatly into the cavity 13' formed between the sheel-shaped bearer and closure parts 11', 12'. In operation the material of the rod 50 is released by liquid entering and leaving via the aperture gap 34 and the released cleaning and rinsing agent is distributed over the windscreen as in the above described embodiments.

Although preferred embodiments of the invention have been described and are illustrated in the drawings, it must be expressely pointed out that men skilled in the art can readily make modifications and changes within the scope of the invention. For instance, the catch means or fastener to connect the two parts can be disposed in the region of the longitudinal edges of the part 12 or in the region of the side wall of the bearer part 11. For instance, one or more press buttons could be used as the catch elements. The particular advantages of the invention reside in the fact that the windscreen wiper arm, or if the bearer part is unitary therewith, directly on the windscreen wiper arm retaining system. To replace the concentrate rod all that must be done is to hinge or lift off the closure part, or pivoting flap or closure flap to provide access to the cavity, insert a fresh rod and release the closure part of flap after the fresh rod has been inserted.

It should be noted that the size of the openings is not critical for the performance of the apparatus but they should be kept as small as possible to make the most economical use of the cleaning agent.

What is claimed is:

1. A windscreen cleaning device for vehicles, adapted to be detachably connected to a windscreen wiper, comprising: a container defining an elongated cavity for receiving a water-soluble, substantially solid cleaning agent; said container comprising a support part forming a closed circumferential wall portion of the container and extending completely over and covering said cavity, said container also comprising a closure part adapted to be fitted to said support part such that the support part and closure part enclose the cavity, said closure part having a wall portion with a grid-like opening zone forming substantially the sole entrance into said cavity, said opening zone being adapted to admit into said cavity splash and rain water carried by a stream of air during motion of the vehicle and also adapted to permit transfer of dissolved cleaning agent by said air out of said cavity onto a windscreen; said container also comprising means for detachably interconnecting said support part and said closure part; and connecting means connected to said support part for detachably connecting the cleaning device to a windscreen wiper in a position such that said closed circumferential wall portion of said support part which covers said cavity, forms the top side of said container and protects said cavity from rain while said vehicle is at rest, and such that said opening zone formed in said closure part points substantially downwardly in the direction towards said windscreen so that an exchange of liquid under the influence of the air stream may take place.

2. A windscreen cleaner device according to claim 1 wherein the cavity has a periphery which is always parallel with the axis of said cavity and the support part and closure part each comprising an element having an open side, the two parts being joined together by their open sides along a substantially dividing plane which is parallel with said axis.

3. A windscreen device according to claim 2 wherein the cavity is substantially cylindrical.

4. A windscreen cleaner device according to claim 4, wherein the closure part has two longitudinal struts which adjoin said dividing plane and extend parallel with one another, and transverse arcuate ribs which connect the longitudinal struts, and are spaced out from one another, said opening zone for the passage of the liquid being formed between the transverse ribs.

5. A windscreen cleaner according to claim 4, wherein at least some of the said ribs have a substantially triangular cross-section, one corner of the section being directed towards the inside of the container.

6. A windscreen cleaner according to claim 2, wherein the cavity defined by the support part and closure part is bounded at its ends by end faces formed from radially inwardly directed walls formed on said two parts, the closure part being made of a resiliently deformable plastics, and the adjacent radially inwardly directed wall portions of the two said parts being formed with catch elements interengaging with one another in pairs for the releasable retention of the closure part on the support part.

7. A windscreen cleaner according to claim 2, wherein the support part is a one-piece injection moulding of resiliently deformable plastics material, the closure part being moulded on to the support part, with provision for pivoting, at a lateral edge via a thinned folding piece forming a resilient joint, and wherein the support part and closure part are formed with co-operating catch elements at a place at a distance from the resilient joint.

8. A windscreen cleaner device according to claim 1 wherein an outwardly projecting, two-armed clamp, which acts as an attaching means for the releasable attachment of the windscreen cleaner device to a windscreen wiper, is mounted on said container, the clamp having at least one pivoting arm which can be moved to embrace a carrier arm of a windscreen wiper, the clamp being lockable in the closed windscreen wiper carrier arm embracing position by a closure.

9. A windscreen cleaner device according to claim 8, wherein the attaching clamp has a substantially U-shaped section, one arm being moulded on to the container and having on the side adjacent the pivotable arm at least one projection adapted to fit into a recess in the windscreen wiper carrier arm, the catch closure being formed by a catch attachment formed at the free end of the pivoting arm and engaging behind a catch shoulder which is fixed in position relative to the container.

10. A windscreen cleaner according to claim 1 wherein at least part of the container is unitary with a windscreen wiper arm.

11. A vehicle windscreen cleaner device having: at least one partially open container which bounds a cavity with a periphery which is substantially parallel to the axis of the cavity and has a support part having a trough-shaped first receiving part which bounds the container cavity over a portion of its periphery; a closure part having a trough-shaped second receiving part adapted to be so joined to the first receiving part in a substantially radial dividing plane that the two receiving parts enclose the cavity all around, the closure part having a grid-like wall zone which is formed with flow apertures for the unimpeded passage of liquid between the container cavity and the surroundings, and detent or locking means for releasably connecting the support part and closure part in their joined position; at least one rod-shaped inserted member of a water-soluble cleaning and/or solvent concentrate, the inserted member having dimensions such that it fits into the container cavity; and attaching means, connected to the support part of the container, for the attachment of the windscreen cleaner at a distance in front of the vehicle windscreen to a wiper, said closure part having a circumferential section covering the top side of said cavity when said container is attached to said wiper whereby rain water is prevented from entering said cavity when said vehicle is at rest, said grid-like wall zone with said apertures pointing downwardly towards a windscreen when said device is attached to said wiper, whereby rain water may enter and dissolved cleaning concentrate may leave through said apertures only under the influence of an airstream during motion of the vehicle.

12. A windscreen cleaner according to claim 11, wherein the container cavity is substantially cylindrically bounded by elements of the first and second receiving parts, and both receiving parts are open on the sides facing one another in the dividing plane, the rod-shaped inserted member having a substantially cylindrical shape and a cross-section which is somewhat smaller than the opening cross-section of the container cavity, so that the inserted member can be inserted loosely in the container cavity.

13. A vehicle windscreen cleaner device according to claim 12 wherein the closure part has two longitudinal struts which adjoin said dividing plane and extend parallel with one another, and transverse ribs which connect the longitudinal struts extend substantially arcuately and are spaced out from one another, the apertures for the passage of the liquid being formed between the transverse ribs.

14. A vehicle windscreen cleaner device according to claim 13, wherein at their end faces the first and second receiving parts are bounded by substantially radial wall portions, the closure part being made of a resiliently deformable plastics material, and the adjacent radial wall portions of the two receiving parts being formed with catch elements interengaging in pairs for the releasable retention of the closure part on the support part.

15. A vehicle windscreen cleaner according to claim 11 wherein an outwardly projecting, two-armed clamp, which acts as said attaching means for the releasable attachment of the windscreen cleaner to a windscreen wiper, is moulded on to the injection moulded plastics support part, the clamp having at least one flap-shaped pivoting arm and being closable by a catch closure while engaging around a carrier arm of the windscreen wiper.

16. A vehicle windscreen cleaner having at least one partially open container which bounds a cavity substantially axis-parallel and has: a metal support part having a trough-shaped first receiving part which bounds the container cavity over a portion of its periphery; a closure part having a trough-shaped second receiving part which can be so joined to the first receiving part in a substantially radial dividing plane that the two receiving parts enclose the cavity all around, the closure part having a grid-like wall zone which is formed with flow apertures for the unimpeded passage of liquid between the container cavity and the surroundings, and locking means for releasably connecting the support part and closure part in their joined position; at least one rod-shaped inserted member of a water-soluble cleaning and/or solvent concentrate, the inserted member having dimensions such that it can be fitted into the container cavity; an elongate metal carrier arm in the form of a motor vehicle windscreen wiper arm which is made unitary with the container support part; and attaching means disposed on the windscreen wiper arm at a distance from the place where it is connected to the support part, for the releasable attachment of the windscreen cleaner at a distance in front of the vehicle windscreen, said closure part having a circumferential section covering the top side of said cavity with said container attached to said wiper arm, whereby rain water is prevented from entering said cavity when said vehicle is at rest, said grid-like wall zone with said apertures pointing downwardly toward a windscreen with said device attached to said wiper, whereby rain water may enter and dissolved cleaning concentrate may leave through said apertures only under the influence of an airstream during motion of the vehicle.

* * * * *